United States Patent
Russell

(10) Patent No.: US 6,463,892 B1
(45) Date of Patent: Oct. 15, 2002

(54) METHOD FOR DETECTING COOLING SYSTEM FAULTS

(75) Inventor: John D. Russell, Farmington Hills, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/785,883

(22) Filed: Feb. 20, 2001

Related U.S. Application Data

(60) Provisional application No. 60/189,647, filed on Mar. 15, 2000.

(51) Int. Cl.[7] .................................................. F01P 5/14
(52) U.S. Cl. .............................. 123/41.15; 123/198 D; 73/118.1
(58) Field of Search .......................... 123/41.05, 41.15, 123/41.01, 198 D; 73/117.3, 118.1

(56) References Cited

U.S. PATENT DOCUMENTS

| | | | |
|---|---|---|---|
| 4,069,712 A | * | 1/1978 | Armstrong et al. .......... 374/145 |
| 4,274,381 A | | 6/1981 | Abo |
| 4,556,029 A | | 12/1985 | Yamaguchi et al. |
| 5,526,871 A | * | 6/1996 | Musser et al. .............. 165/11.1 |
| 5,551,396 A | | 9/1996 | Suzuki et al. |
| 6,200,021 B1 | * | 3/2001 | Mitsutani et al. .............. 374/1 |
| 6,240,774 B1 | * | 6/2001 | Niki et al. ................ 123/41.01 |
| 6,302,065 B1 | * | 10/2001 | Davison ................... 123/41.15 |
| 6,321,696 B1 | * | 11/2001 | Nishioka et al. .......... 123/41.15 |

* cited by examiner

Primary Examiner—Tony M. Argenbright
Assistant Examiner—Hai H. Huynh
(74) Attorney, Agent, or Firm—Julia Voutyras; Allan Lippa

(57) ABSTRACT

A method for diagnosing engine thermostat is presented. Indicated engine coolant temperature is estimated based on engine operating conditions, such as engine speed, net engine torque, air flow, fuel-air ratio, net engine torque, etc. This estimate is compared to the reading of the engine coolant temperature sensor in areas below the temperature at which the thermostat starts to open and above in order to detect degradation in the performance of the sensor or the engine thermostat. If the estimate and the reading agree in one area and disagree in the other, then the thermostat performance is degraded. If the estimate and the reading disagree in both temperature ranges, then the coolant sensor performance may be degraded.

14 Claims, 4 Drawing Sheets

METHOD FOR DETECTING COOLING SYSTEM FAULTS

CROSS-REFERENCE TO RELATED APPLICATION

The present application claims priority from provisional application U.S. Ser. No. 60/189,647, filed Mar. 15, 2000.

TECHNICAL FIELD

The present invention relates generally to systems for diagnosing engine thermostat in a vehicle equipped with an internal combustion engine.

BACKGROUND OF THE INVENTION

Vehicle cooling systems typically have a coolant temperature sensor for providing coolant temperature information to the electronic engine controller and a thermostat for providing constant coolant temperature control. The purpose of the cooling system is to remove surplus heat from the engine, maintain an even and efficient heat level, and to bring the cold engine up to the efficient heat level as soon as possible after starting. When the engine is cold, the thermostat closes and confines the coolant to the engine, enabling it to heat up quickly. When the coolant reaches a predetermined temperature, the thermostat starts to open and allows coolant to circulate. The thermostat constantly changes the size of its opening depending on engine heat conditions. If the cooling system performance is degraded, engine performance may be compromised. For example, if the thermostat does not open once the coolant reaches a certain temperature, engine may overheat. Also, if the thermostat is stuck open, the engine will not heat up properly, a rich fuel-air mixture may be supplied longer than necessary, thus potentially degrading emissions and fuel efficiency. Similarly, if the engine coolant temperature sensor is not indicating actual coolant temperature, emissions, fuel efficiency and driver satisfaction will be degraded. One method of diagnosing the engine coolant system is described in U.S. Pat. No. 4,274,381. Engine coolant temperature is inferred from a temperature sensor such as the temperature sensor of the catalytic converter. This inferred value is compared to the value read by the coolant temperature sensor. If the two values are not the same, sensor degradation is indicated. Then, a signal corresponding to the output of the engine coolant temperature sensor under normal engine operating conditions replaces the output of the degraded coolant temperature sensor.

The inventor herein has recognized a disadvantage with this approach. In particular, this method does not diagnose the cooling system thermostat. As long as the readings from the two sensors agree, the system is assumed to be functioning properly. However, if engine operating conditions indicate a certain coolant temperature level, and the actual coolant temperature is different, the thermostat may be stuck in an open or closed state. If the thermostat performance is degraded, efficient temperature levels will not be maintained under all operating conditions, and thus, vehicle performance, fuel efficiency and emission control may be degraded. Also, the prior art does not use a cooling system model to estimate what coolant temperature should be based on engine operating conditions. Further, it does not take into account changes in the cooling system based on the open or closed state of the thermostat.

SUMMARY OF THE INVENTION

An object of the present invention is to provide a method for diagnosing a cooling system in an internal combustion engine, and in particular to diagnosing the engine thermostat.

The above object is achieved and disadvantages of prior approaches overcome by a method for diagnosing a thermostat in an internal combustion engine, the method comprising: estimating an engine coolant temperature based on an operating condition and a characteristic of the thermostat; reading said engine coolant temperature; and determining that the thermostat performance is degraded if said reading agrees with said estimate in a first operating region, and said reading disagrees with said estimate in a second operating region.

An advantage of the above object of the invention is that a method of diagnosing the engine thermostat is developed. By determining agreement in one region and disagreement in a second region, it is possible to isolate thermostat degradation from engine coolant temperature sensor degradation.

Other objects, features, and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

DESCRIPTION OF THE INVENTION

Figure 1:
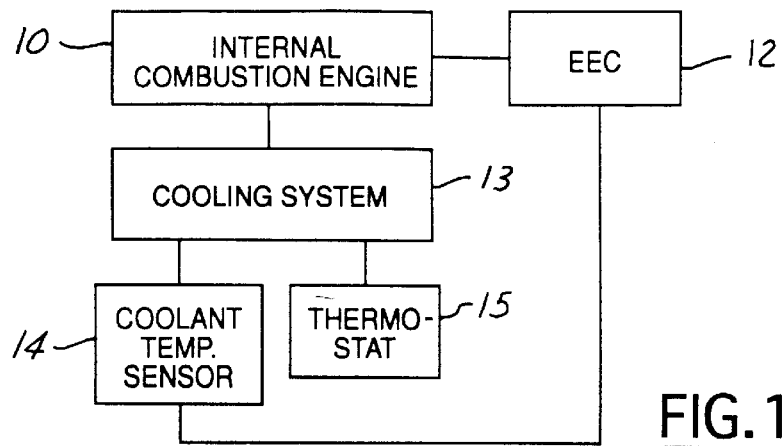
FIG. 1 is a block diagram of a vehicle illustrating various components related to the present invention.
Figure 2:
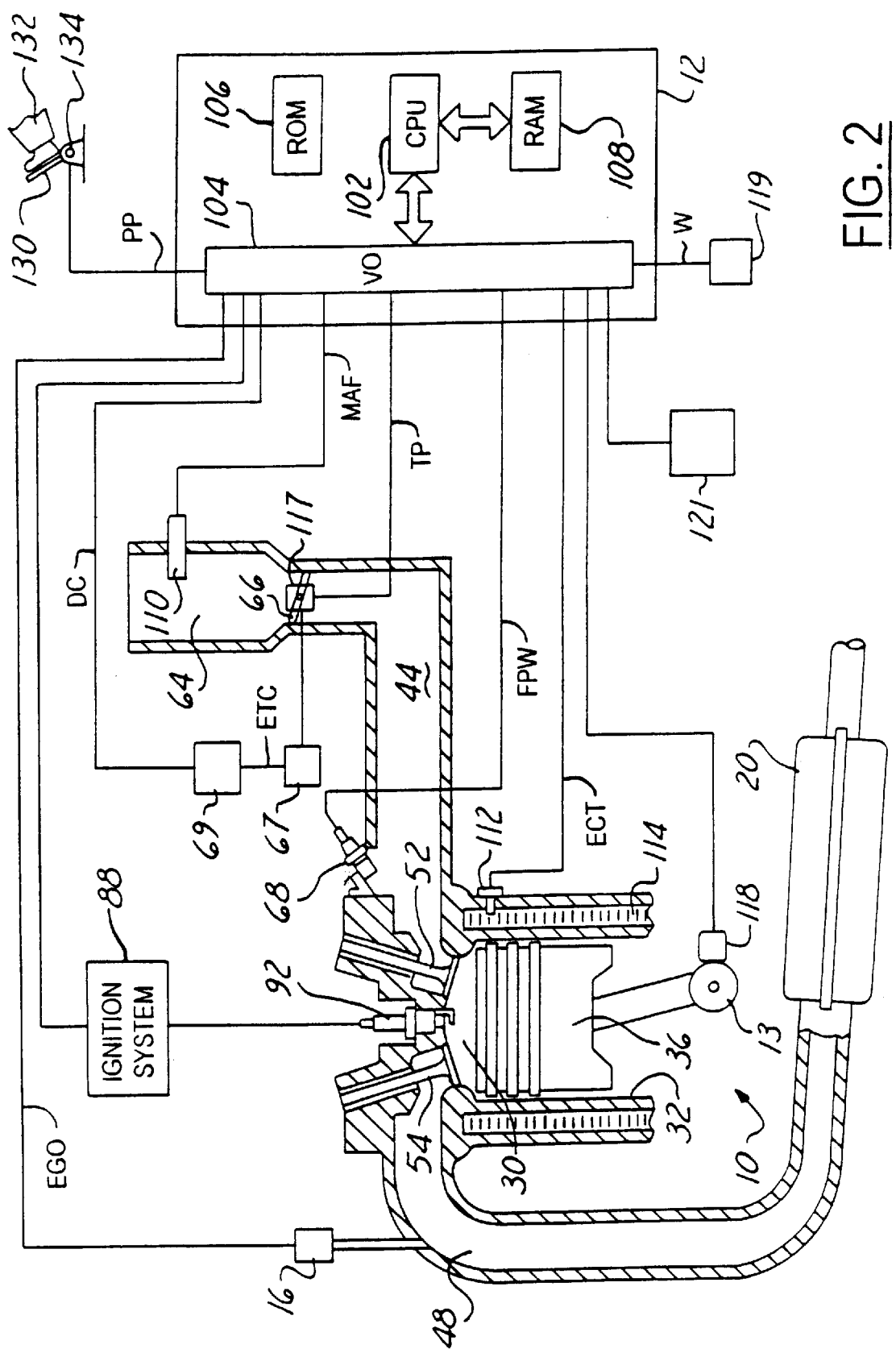
FIG. 2 is a block diagram of an engine in which the invention is used to advantage.

Referring to FIG. 1, an internal combustion engine 10, further described herein with particular reference to FIG. 2, is shown coupled to the electronic engine controller 12, and to the cooling system 13. Cooling system 13 is also coupled to a thermistor type engine coolant temperature sensor 14, and to a thermostat 15. The thermostat 15 opens when engine coolant temperature exceeds a predetermined high value to allow coolant to circulate and thus facilitate engine cooling. The coolant temperature sensor 15 is also coupled to the electronic engine controller 12. The information provided by the coolant temperature sensor is used in a variety of engine control strategies, such as emissions, fuel injection, etc.

Electronic engine controller 12 controls internal combustion engine 10 having a plurality of cylinders, one cylinder of which is shown in FIG. 2. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width signal (fpw) from controller 12. Fuel is delivered to fuel injector 68 by a conventional fuel system (not shown) including a fuel tank, fuel pump, and fuel rail (not shown).

Engine 10 further includes conventional distributor-less ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (We). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12. In an alternate embodiment, throttle plate 66 communicates with the driver's foot through a mechanical linkage. The position of throttle plate 66 is measured by throttle position sensor 117, and sent to controller 12.

Figure 3:
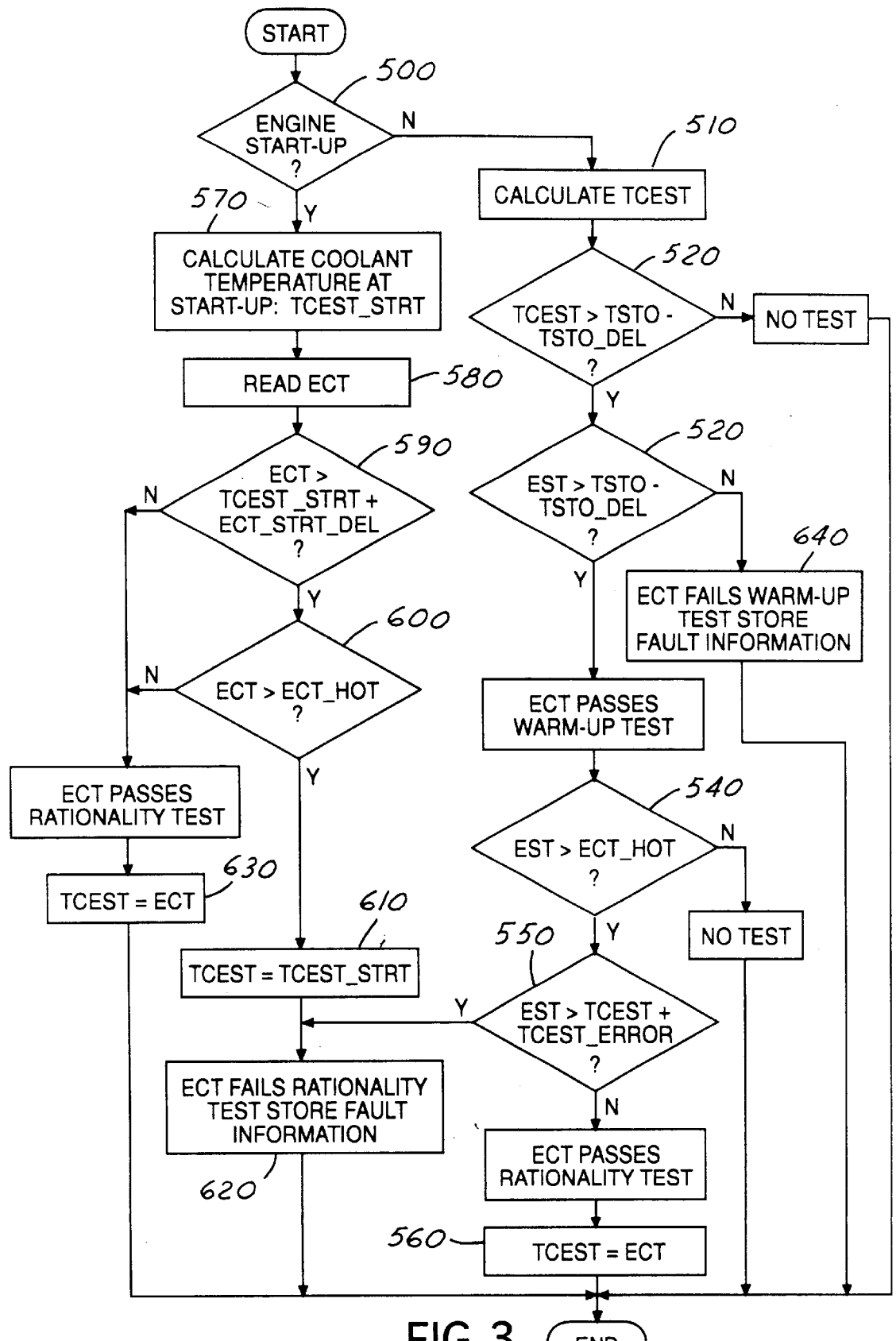

Referring now to FIG. 3, a routine is described for using the estimated engine coolant temperature value to diagnose the engine coolant temperature sensor and the thermostat. First, in step 500 a determination is made whether the vehicle has just been turned on (engine start-up). If the answer to step 500 is YES, estimated coolant temperature at start-up, TCEST_STRT is calculated in step 570 (see step 710 of FIG. 4). The routine then proceeds to step 580 where the value of the engine coolant temperature sensor, ECT, is read. Next, in step 590 a determination is made whether the value read by the sensor exceeds the estimated engine coolant temperature at engine start-up by a value larger than a preselected tolerance, ECT_STRT_DEL. If the answer to step 590 is NO, the engine coolant temperature sensor passes the rationality test and the routine is exited. If the answer to step 590 is YES, the routine proceeds to step 600, whereupon a decision is made whether the engine coolant temperature sensor reading exceeds a predetermined tolerance level, ECT_HOT. If the answer to step 600 is NO, the sensor passes the rationality test and the routine proceeds to step 630, whereupon the estimated value of the engine coolant temperature, TCEST, is seeded with the measured coolant temperature, ECT. The routine is exited. If the answer to step 600 is YES, the sensor fails the test and in step 610 the estimated value of the engine coolant temperature is set to be equal to the estimated value of the engine coolant temperature at engine start-up. The routine proceeds to step 620 whereupon a diagnostic code is set, and the routine is exited.

If the answer to step 500 is NO, the routine proceeds to step 510 whereupon the estimated value of the engine coolant temperature, TCEST, is calculated. The details of step 510 are described in FIG. 5. Next, in step 520, a decision is made whether the above estimated value exceeds the coolant temperature at which the thermostat is supposed to open by more than a predetermined tolerance amount. In other words, a decision is made whether the coolant temperature is high enough for the thermostat to open. If the answer to step 520 is NO, no thermostat test can be performed and the routine is exited. If the answer to step 520 is YES, a decision is made in step 530 whether the value read by the engine coolant temperature sensor exceeds the temperature at which the thermostat is supposed to open, TSTO, by more than a small predetermined tolerance. If the answer to step 530 is NO, the engine coolant temperature sensor does not pass the warm-up test, a diagnostic code is set in step 640 and the routine is exited. In other words, if the estimated engine coolant temperature is at the level at which the thermostat is supposed to open, and the temperature read by the coolant temperature sensor is below that value, a decision is made that either the sensor or the thermostat are not functioning properly, and a diagnostic code is set.

If the answer to step 530 is YES, the sensor passes the test, and the routine proceeds to step 540 whereupon a determination is made whether the engine coolant temperature sensor reading exceeds a predetermined tolerance level, ECT_HOT. If the answer to step 540 is NO, the routine exits. If the answer to step 540 is YES, the routine proceeds to step 550 where a determination is made whether the value read by the engine coolant temperature sensor exceeds the estimated value by larger than a small predetermined tolerance, TCEST_ERROR. If the answer to step 550 is YES, i.e., the value read by the sensor is significantly higher than the estimated value, a decision is made that the sensor is not functioning properly, and the routine proceeds to step 620 as described above. If the answer to step 550 is NO, the sensor is functioning properly and the routine proceeds to step 560 whereupon the value of estimated engine coolant temperature, TCEST, is set to be equal to the actual value read by the engine coolant temperature sensor, ECT. The routine then exits. If it is determined that the engine coolant temperature sensor is not functioning properly, the estimated coolant temperature value can be substituted to enable normal vehicle operation until service time. In that way, improved customer satisfaction as well as improved vehicle performance will be achieved.

Figure 4:
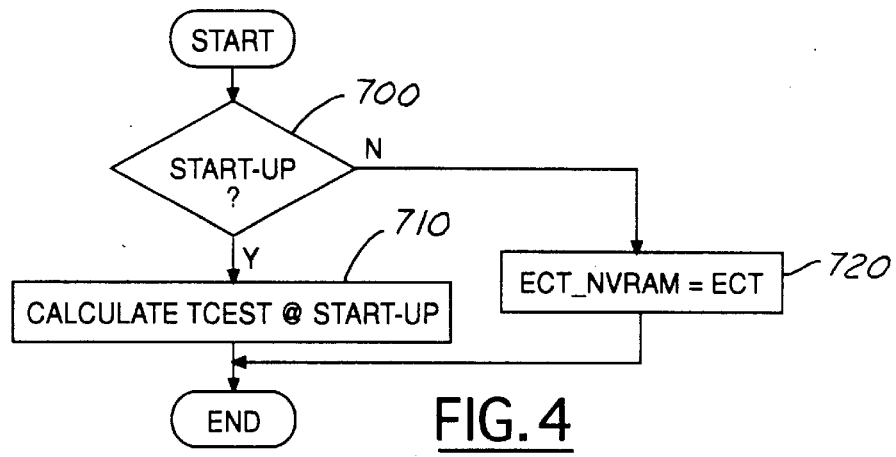
FIGS. 3, 4, 5 and 6 are block diagrams of embodiments in which the invention is used to advantage.

Moving on to FIG. 4, a routine is described for calculating estimated engine coolant temperature at engine start-up. First, in step 700, a decision is made whether the engine has just started. If the answer to step 700 is YES, estimated engine coolant temperature at start-up, TCEST_STRT, is calculated in step 710 according to the following equation:

TCEST_STRT=(ECT_NVRAM−T0)*EXP(−SOAK_TIME/TAU)+T0, where ECT_NVRAM is the engine coolant temperature stored in non-volatile memory, and corresponds to the engine coolant temperature at shutdown, T0 is ambient temperature, SOAK_TIME is engine off time, and TAU is an empirically derived time constant. This value is used in step 570 of FIG. 3. The routine then exits. If the answer to step 700 is NO, the routine proceeds to step 720, whereupon the value read by the engine coolant temperature sensor is stored in non-volatile memory, and the routine is exited.

Figure 5:
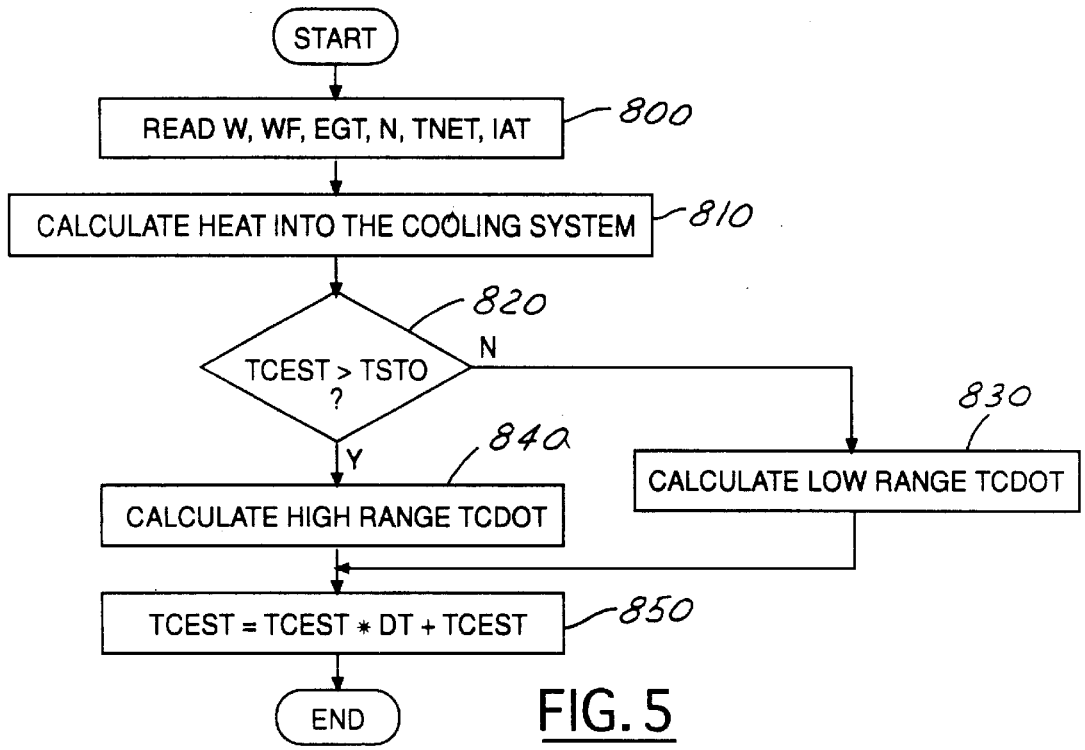

Referring now to FIG. 5, a routine is described for estimating engine coolant temperature based on the engine thermodynamic model. First, in step 800, engine parameters, such as air flow, W, fuel flow, WF, exhaust gas temperature, EGT, engine speed, N, net torque, TNET, and inlet air temperature, IAT, are read. Then, in step 810, heat transferred into the cooling system, QCDOT, is calculated according to the following equation:

QCDOT=WF*HFV−(W*CPA+WF*CPF)*(EGT−IAT)−N*TNET, where HVF is the lower heating value of the fuel, CPA is the constant pressure specific heat of air, and CPF is the constant pressure specific heat of the fuel.

Next, in step 820, a determination is made whether the estimated value of the engine coolant temperature, TCEST, is larger than the threshold temperature at which the thermostat should start to open, TSTO. The initial value for TCEST comes from steps 620, FIG. 1. If the answer to step 820 is NO, i.e., the estimated coolant temperature is below the threshold at which the thermostat is supposed to start opening, the rate of change of coolant temperature, TCDOT, is calculated according to the low coolant temperature model. If the answer to step 820 is YES, the high coolant temperature model is used to estimate TCDOT in step 840. Once steps 830 or 840 are completed, the routine proceeds to step 850 where TCEST is calculated according to the following equation:

$$TCEST=TCDOT*DT+TCEST,$$

where DT is a predetermined time interval. The routine then exits.

Figure 6:
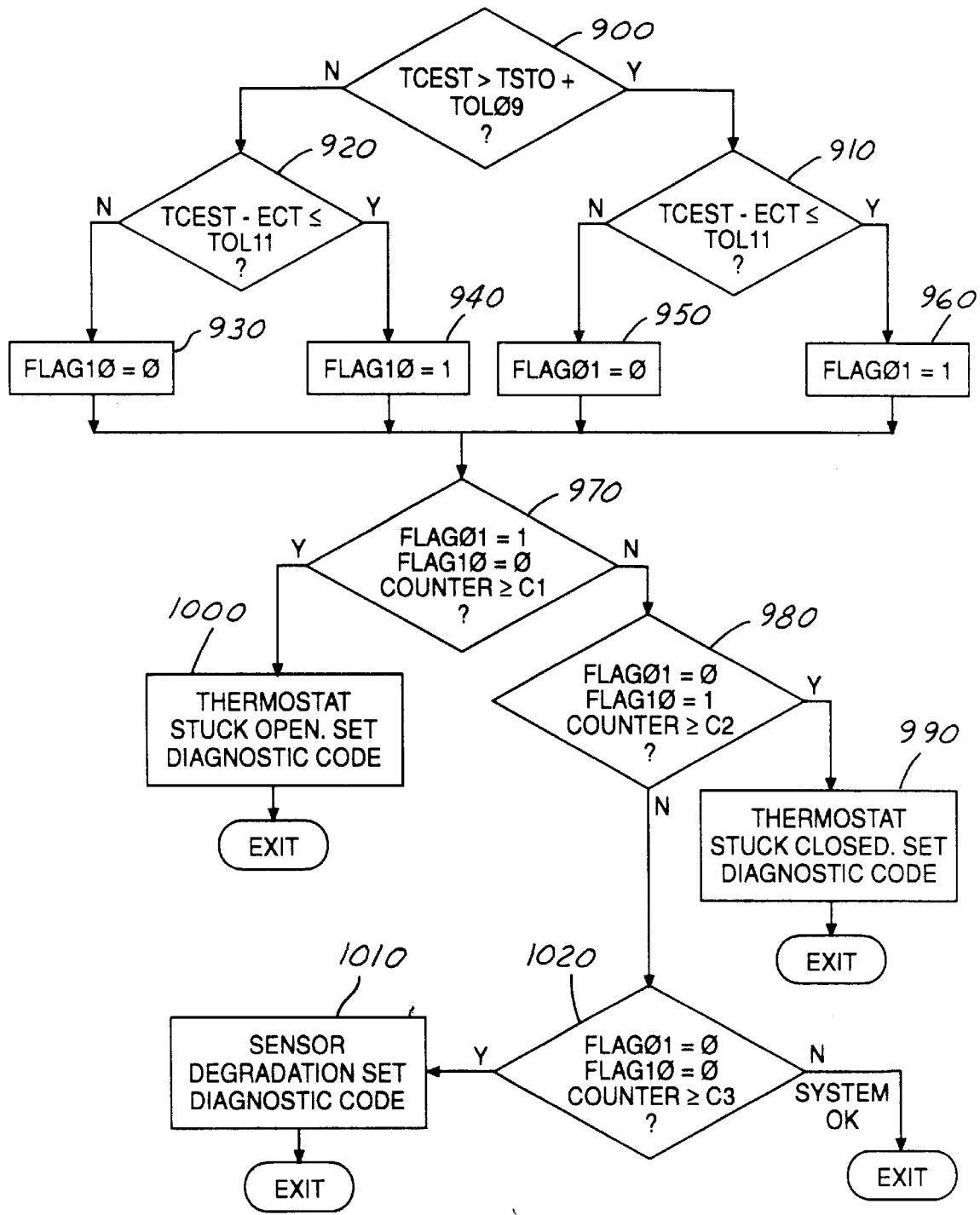

Referring now to FIG. 6, a routine is described for diagnosing the cooling system thermostat. First, in step 900, a decision is made whether the estimated engine coolant temperature (TCEST) is greater than the temperature at which the thermostat starts to open (TCSTO) within a small predetermined tolerance, TOL01. If the answer to step 900 is YES, the routine proceeds to step 910 whereupon a determination is made whether the difference between the estimated engine coolant temperature and the coolant temperature read by the sensor is less than or equal to a small predetermined constant, TOL11. If the answer to step 910 is YES, the routine proceeds to step 960 whereupon a flag FLAG01 is set to 1. The routine then proceeds to step 970. If the answer to step 910 is NO, the routine proceeds to step 950, whereupon a flag FLAG01 is set to 0. The routine then proceeds to step 970.

If the answer to step 900 is NO, the routine proceeds to step 920 and a decision is made whether the difference between the estimated engine coolant temperature and the coolant temperature read by the sensor is less than or equal to a small predetermined constant, TOL11. If the answer to step 920 is YES, the routine proceeds to step 940 whereupon a flag FLAG10 is set to 1. The routine then proceeds to step 970. If the answer to step 920 is NO, the routine proceeds to step 930, whereupon a flag FLAG10 is set to 0. The routine then proceeds to step 970.

Continuing in step 970, a decision is made whether FLAG01 is 1, FLAG10 is 0, and a counter is greater than or equal to a preselected value C1. If the answer to step 970 is YES, i.e., the reading disagrees with the estimate for temperatures below TSTO, and agrees with the estimate for temperatures above TSTO, for a period of time greater than or equal to C1, the thermostat is diagnosed as stuck open, a diagnostic code is set in step 1000, and the routine exits. If the answer to step 970 is NO, the routine proceeds to step 980 whereupon a determination is made whether FLAG01 is 0, and FLAG10 is 1, and a counter is greater than or equal to a preselected value C2. If the answer to step 980 is YES, i.e., the reading agrees with the estimate for temperatures below TSTO, and disagrees for temperatures above TSTO, for a period of time greater than or equal to C3, the thermostat is diagnosed as stuck closed, a diagnostic code is set in step 990, and the routine exits. If the answer to step 980 is NO, the routine proceeds to step 1020 whereupon a decision is made whether FLAG01 is 0, and FLAG10 is 0, and a counter is greater than or equal to a preselected value C1. If the answer to step 1020 is YES, i.e., the reading and the estimate disagree both in the region below TSTO and above TSTO for a period of time greater than C1, the engine coolant temperature sensor is diagnosed as degraded, a diagnostic code is set in step 1010, and the routine exits.

Engine coolant temperature is estimated from the thermodynamic characteristics of the engine by estimating heat added to the coolant. The heat added to the coolant is used to estimate the rate of change of coolant temperature, which is then integrated over time to estimate engine coolant temperature. The estimated temperature is compared to the temperature reading provided by the engine coolant temperature sensor to diagnose the cooling system. If the estimate agrees with the reading in the region below the temperature at which the thermostat starts to open (TSTO), and disagrees with the estimate in the area above TSTO, the thermostat is diagnosed as stuck closed, and a diagnostic code is set. If the estimate disagrees with the reading for temperatures below TSTO, and agrees with it for temperatures above TSTO, the thermostat is diagnosed as stuck open, and a diagnostic code is set. The readings are taken continuously for a period of time before diagnostics are performed, to allow for system delays.

This concludes the description of the invention. The reading of it by those skilled in the art would bring to mind many alterations and modifications without departing from the spirit and the scope of the invention. Accordingly, it is intended that the scope of the invention is defined by the following claims.

I claim:
1. A method for diagnosing a thermostat in an internal combustion engine, the method comprising:
    estimating an engine coolant temperature based on an operating condition and a characteristic of the thermostat;
    reading said engine coolant temperature;
    determining that the thermostat performance is degraded if said reading agrees with said estimate in a first operating region, and said reading disagrees with said estimate in a second operating region; and
    indicating that said engine coolant temperature sensor performance is degraded if said estimate and said reading disagree for temperatures below and above said specified temperature.
2. The method recited in claim 1 wherein the thermostat performance is degraded if the thermostat is stuck open or stuck closed.
3. The method recited in claim 1 wherein a border between said first operating region and said second operating region is a temperature at which the thermostat starts to open.
4. The method recited in claim 3 further comprising diagnosing the thermostat stuck closed when said reading and said estimate agree for temperatures below said border, and disagree for temperatures above said border.
5. The method recited in claim 3 further comprising diagnosing the thermostat stuck open when said reading and said estimate disagree for temperatures below said border, and agree for temperatures above said border.
6. The method recited in claim 1 wherein said characteristic of the thermostat is an opened or closed state.
7. The method recited in claim 1 wherein said characteristic of the thermostat is an opening temperature.
8. The method recited in claim 1 wherein said operating condition is an engine speed.
9. The method recited in claim 1 wherein said operating condition is an fuel-air ratio.
10. The method recited in claim 1 wherein said operating condition is a net engine torque.
11. A method for diagnosing a thermostat in an internal combustion engine, the method comprising:
    estimating an engine coolant temperature based on an operating condition and a characteristic of the thermostat;

reading engine coolant temperature from an engine coolant temperature sensor;

comparing said estimate to said reading;

determining that the thermostat is stuck closed if said estimate and said reading agree for temperatures below a specified temperature, and said estimate and said reading disagree for temperatures above said specified temperature; and determining that the thermostat is stuck open if said estimate and said reading agree for temperatures above a specified temperature, and said estimate and said reading disagree for temperatures below said specified temperature; and indicating that said engine coolant temperature sensor performance is degraded if said estimate and said reading disagree for temperatures below and above said specified temperature.

12. The method recited in claim 11 wherein said specified temperature is a temperature at which the thermostat starts to open.

13. The method recited in claim 11 wherein said characteristic of the thermostat is an open or closed state.

14. The method recited in claim 11 wherein said estimating further comprises using an engine thermodynamic model to calculate a rate of change of said engine coolant.

* * * * *